Dec. 8, 1959 W. E. McCONALOGUE 2,916,143
RAPID CLOSURE LOCKING MEANS FOR PRESSURE VESSELS
Filed May 14, 1957 4 Sheets-Sheet 1
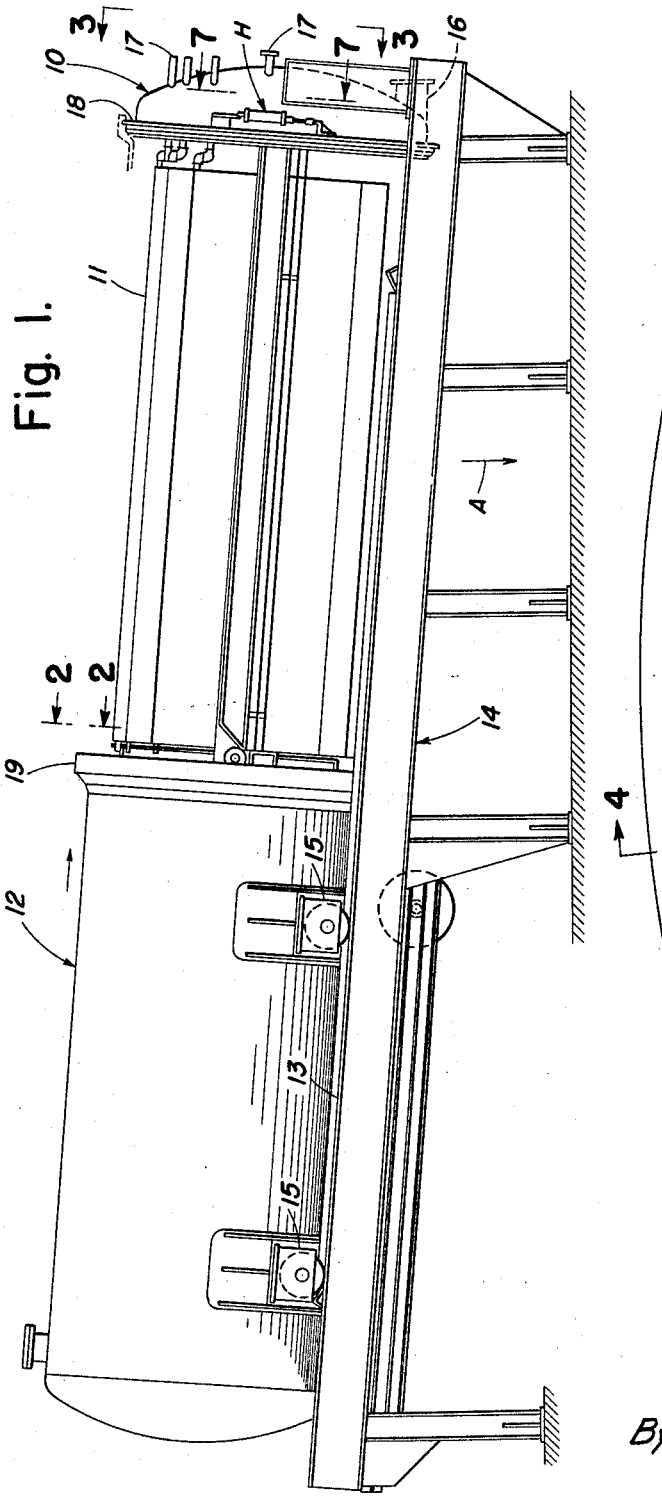
INVENTOR
Wesley E. McConalogue
By Theodore M. Jablon
ATTORNEY Dec. 8, 1959 W. E. McCONALOGUE 2,916,143
RAPID CLOSURE LOCKING MEANS FOR PRESSURE VESSELS
Filed May 14, 1957 4 Sheets-Sheet 2

INVENTOR
Wesley E. McConalogue
BY *Theodore M. Jablon*
ATTORNEY

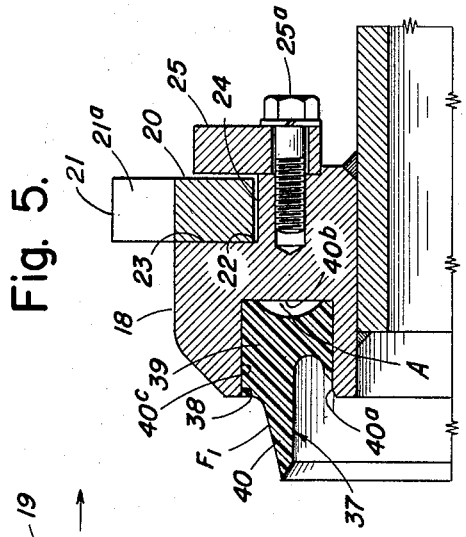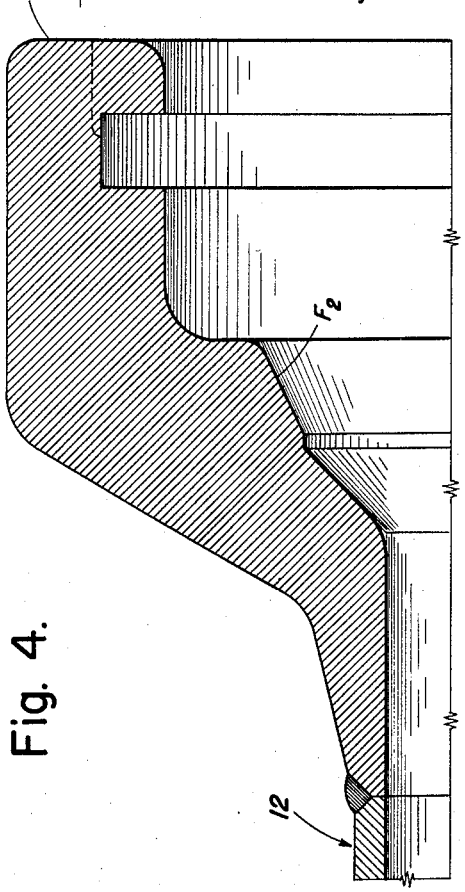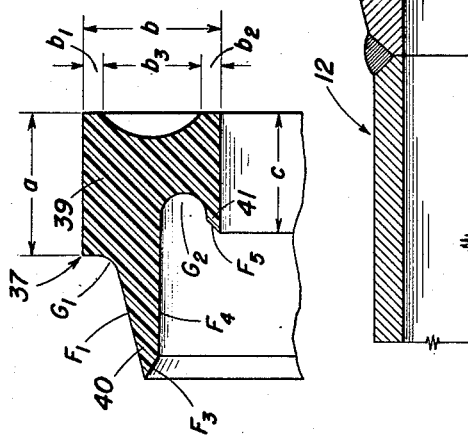

United States Patent Office 2,916,143
Patented Dec. 8, 1959

2,916,143

RAPID CLOSURE LOCKING MEANS FOR PRESSURE VESSELS

Wesley E. McConalogue, San Francisco, Calif., assignor to Dorr-Oliver Incorporated, Stamford, Conn., a corporation of Delaware Application May 14, 1957, Serial No. 659,114

5 Claims. (Cl. 210—236)

This invention relates to improvements in batch-operated pressure type filter units.

Such a filter comprises a horizontally disposed drum or cylindrical shell or casing having its entrance end closed by a removable cover structure or closure member which in turn carries and is unitary with a bank of filter elements extending from a filter head into the shell.

In such a pressure filter unit the filter head is stationary, whereas the shell or casing proper is movable on tracks horizontally towards or away from the filter head in a manner to expose the filter elements for discharging the filter cake therefrom to a receptacle below, as the unit is operated in batch-wise or intermittent fashion. Consequently, a stationary filter head is provided with a connection for pressure feeding the pulp into the shell, as well as with filtrate outlet connections discharging the filtrate liquid from the interior of the filter elements. In other words, a pulp to be subjected to filtration enters the shell by force-feeding via a supply connection in the filter head, while filtrate liquid is being discharged from the interior of the filter elements via the discharge connections in the filter head.

The batch-wise operation of such a pressure filter unit therefore comprises periods of pressure feeding and filtration in alternation with periods of interruption and filter cake discharge. Hence, there is a general problem to minimize the "down-time" or periods of interruption in the filter operation, and to provide closure locking devices that can be operated in a rapid fashion, are simple and inexpensive in construction, as well as efficient in holding the pressurized contents of the shell against leakage, and which are compact in arrangement in a sense that they offer minimum of obstruction with respect to access to the area of the filter head in view of the various aforementioned operating connections provided therein.

This problem will be more readily appreciated from the fact that conventional rapid closure locking mechanism now largely used in connection with this batch type pressure filter unit, is in the nature of a rather heavy, expensive structural encumbrance upon the area of the filter head, in that it comprises a spider type structure having a large number of radial locking bars extending in all directions from a hub section of a spider structure at the center of the filter head. The locking bars are operable from the central hub section to be radially extended or retracted all in unison when locking or unlocking the filter head relative to the shell. For motivating the radial locking bars, link, cam, or toggle means or their kinematic equivalents must be provided as part of the locking mechanism, all of which together must nevertheless be disposed within the area of the filter head in such a manner as to avoid interference with the various feed and discharge connections carried by the filter head. Yet, access is likely to be hampered in respect to the mounting and manipulation of these connections.

Therefore, a further and more specific problem is to provide rapid closure locking means which, in addition to being simple, relatively inexpensive, light in weight, and conveniently operable, should leave the area of the filter head substantially unencumbered while providing free access to all the operating connections forementioned that are carried by the filter head.

An additional object is to provide rapid closure locking mechanism which, in addition, will readily lend itself for the application thereto of power actuating means to effect the locking and unlocking, and which is readily and inexpensively convertible from hand operation to power actuation, so that further reduction in manpower, as well as further reduction in the length of the periods of interruption is thereby attainable.

To this end, the present invention provides the filter head with an annular locking member or locking ring surrounding and rotatably retained upon the rim portion of the filter head and in concentric relationship therewith. With the shell and the filter head being brought into closing engagement at each other, the locking ring on the filter head can be rotated for locking engagement with the surrounding peripheral entrance portion of the shell, thus to secure the filter head to the shell.

That is to say, the locking ring is formed with outward projections spaced from one another and thus alternating with recesses, so that the outer peripheral portion of the locking ring represents an endless sequence of uniform crenelations. The entrance portion of the shell is formed in a complementary fashion with inward projections and recesses to constitute a complementary series of crenelations for interlocking with those of the locking ring.

The closing and locking operation in such a pressure filter unit, with the improved locking means of this invention, comprises moving the shell upon its track towards the filter head with the locking ring in a predetermined rotational position such that its outward radial projections will pass through the corresponding recesses betweeen the inward radial projections at the entrance of the shell. After the filter head and the shell have closed upon each other, the locking ring is rotated sufficiently to have its projections lodge behind those of the shell to interestablish locking relationship therewith. With the parts, thus mechanically secured in closing and locking relationship with respect to each other, the actual sealing against leakage of pressure fluid from within the shell along the peripheral juncture line is effected by a sealing ring of elastically deformable material such as rubber disposed and shaped in a manner to overlie the juncture line between the filter head and the shell, thus sealing against the internal pressure in the shell with the pressure itself acting upon the sealing ring in a manner to insure the sealing effect thereof.

Some of the features of this invention relate to power means for facilitating the rotating of the locking ring as between the locking and the unlocking position thereof, effective to apply to the locking ring a true or balanced actuating torque.

Specific features of the power actuation are concerned with the arrangement of hydraulic actuating cylinder units carried by the filter head and disposed relative to one another and relative to the locking ring in a manner to apply thereto, a true or balanced operating torque for locking and unlocking.

Other features deal with details of construction and arrangement of the rubber sealing ring blanketing the line of juncture between the shell and the filter head.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In the drawings:

Figure 1 is a general semi-diagrammatic side view of the pressure filter unit embodying the invention, showing the filter shell upon its track withdrawn from the filter head, indicating a period of filter cake discharge.

Figure 2 is a greatly enlarged detail end view of the peripheral entrance portion of the shell, taken on line 2—2 of Figure 1.

Figures 4 and 5 are detail sectional views showing the entrance portion of the shell and of the rim portion of the filter head respectively, taken on line 5—5 of Figure 3.

Figure 5a is a detail view of the cross-sectional profile of the sealing ring of Figure 5.

Figure 6 is a detail view showing the details of the shell and of the filter head of Figures 4 and 5 respectively, in closed locking relationship with one another.

Figure 3:
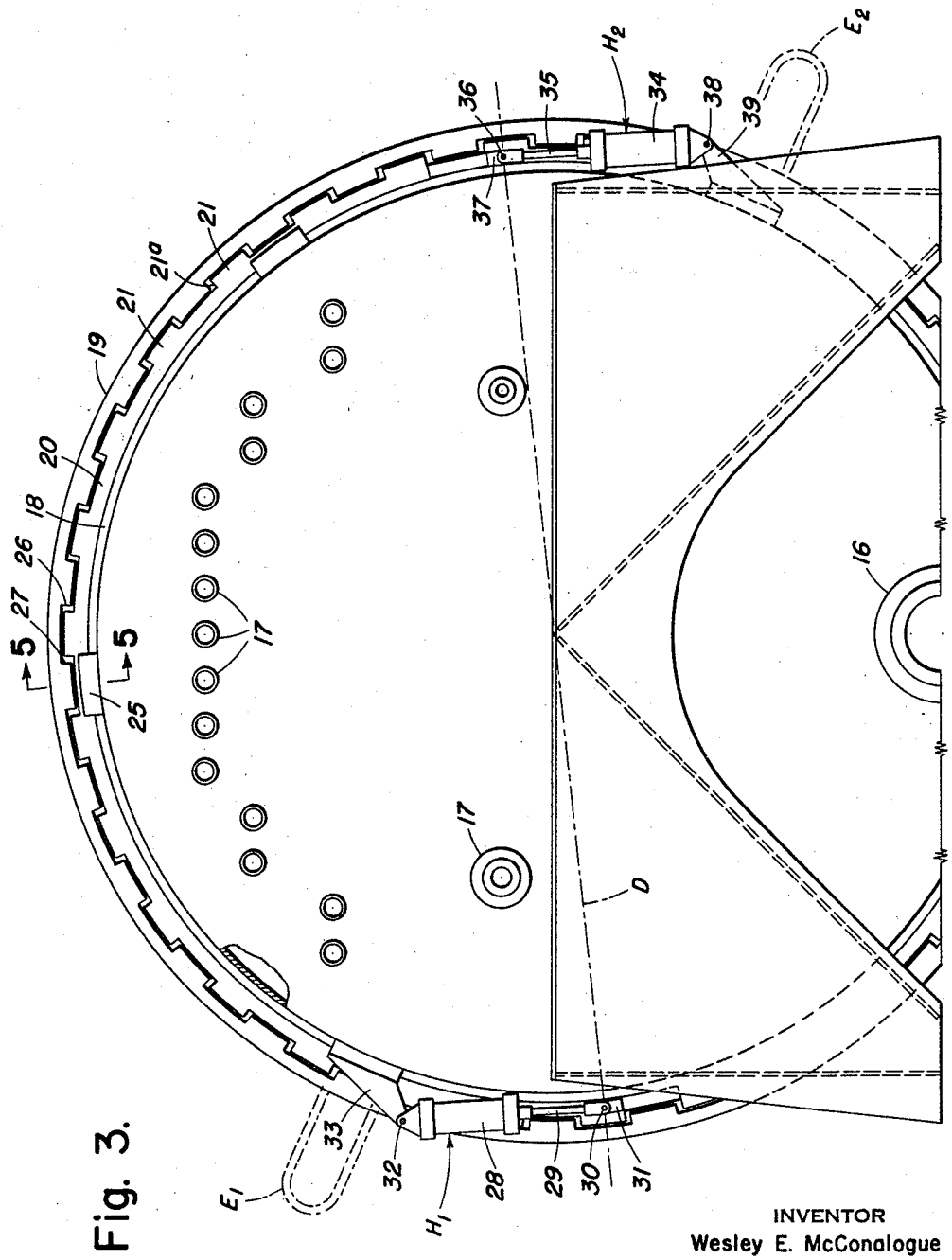
Figure 3 is an end view of the filter unit, looking upon the filter head according to the line 3—3 in Figure 1.
Figures 7, 8:
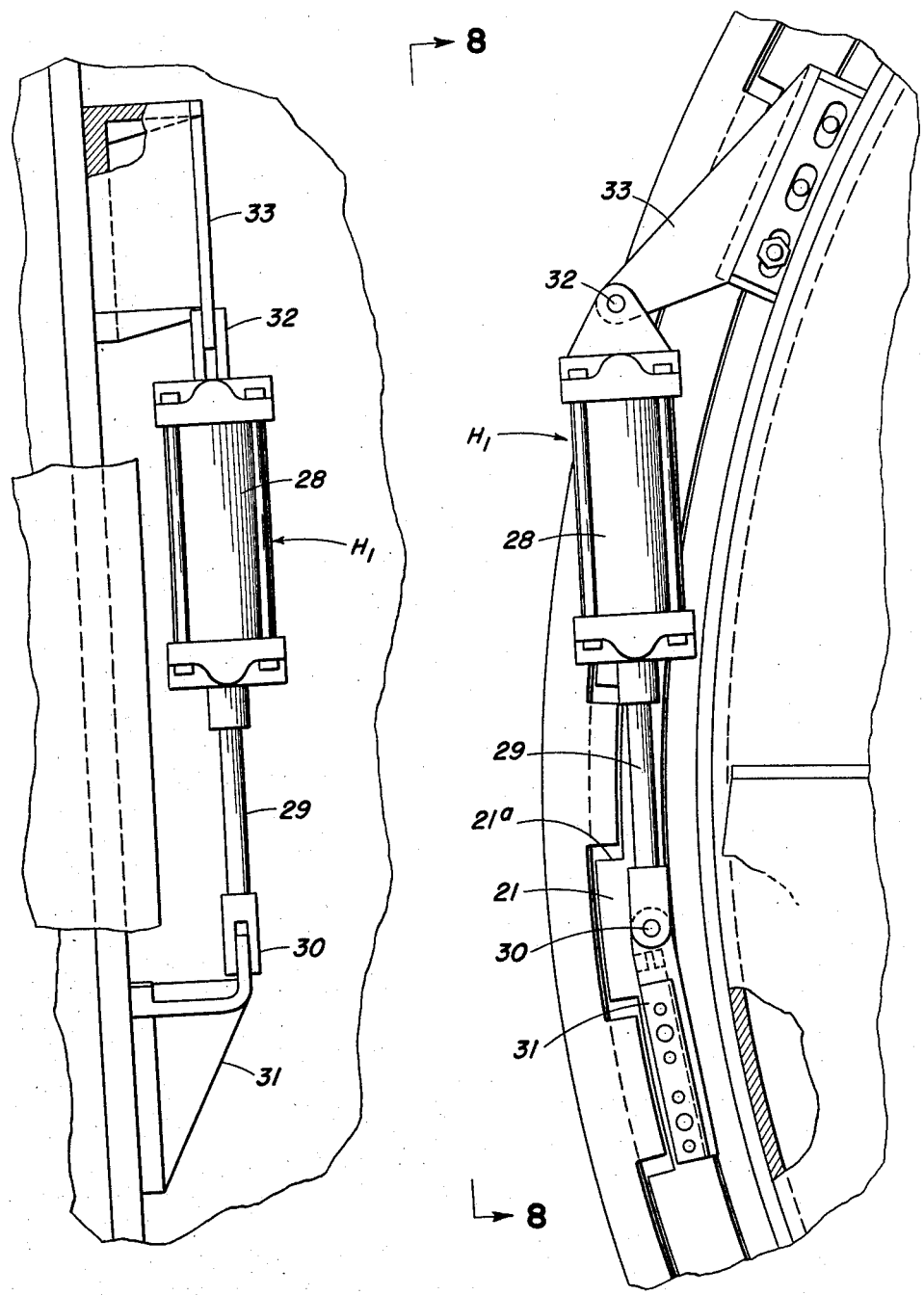
Figure 7 is enlarged detail view of the filter head, taken on line 7—7 of Figure 1, showing the hydraulic cylinder units carried by the filter head to effect locking and unlocking rotation of the locking ring.
Figure 8 is a side view upon one of the hydraulic cylinder units, taken on line 8—8 of Figure 7.

The pressure filter unit shown to embody this invention appears in the full side view in Figure 1 indicating that phase in the batch-wise operation of the unit where the cylindrical shell is withdrawn from the stationary filter head exposing the filter elements for the purpose of discharging the solids accumulation or filter cake therefrom into a receptacle below. The cylindrical shell is horizontally disposed and movable horizontally and longitudinally on tracks towards and away from the stationary filter head.

As shown semi-diagrammatically in Figure 1, the pressure filter unit comprises as main component parts a stationary filter head 10 having unitary and operatively connected therewith a bank of filter elements 11, and a cylindrical wheeled shell 12 horizontally disposed and movable on tracks 13 provided by a supporting structure 14, that structure also furnishing support for the stationary filter head 10. The shell 12 has sets of wheels or rollers 15 whereby it is conveniently movable upon the tracks into and out of closing engagement with the filter head. With the shell 12 in its withdrawn position as shown in Figure 1, filter cake discharging downwardly is indicated by the arrow A. Following the discharge and cleaning of the filter media of the filter elements, the shell 12 is moved upon the tracks from its Figure 1 position into closing position with respect to the filter head, such closing position being fractionally indicated by the dot-and-dash line position of shell 12 in Figure 1.

The locking means for securing the shell 12 to the filter head 10, are indicated in Figure 1 by the showing therein of an hydraulic power cylinder unit H for effecting the rotational adjustment of the locking ring, all of which is to be described in greater detail herein below.

The filter head 10 being stationary upon the supporting structure 14 is provided with a pulp feed supply connection 16 communicating with the interior of the shell 12 when the unit is closed, and a plurality of filtrate discharge connections 17 communicating with the interior of respective filter elements 11.

The filter head 10 has a rim portion 18, whereas the shell 12 has a widened entrance portion 19, the rim portion of the filter head lodging within the entrance portion of the shell when both are brought into closing relationship with each other. A plurality of hydraulic power cylinder units H are marginally disposed upon the filter head, operable to expand and contract in unison for imparting turning movement to a turnable locking ring 20 that is concentric with and interposed between the rim portion of the filter head and the surrounding portion of the shell. In other words this locking ring surrounds the rim portion of the filter head, and in turn is surrounded by the entrance portion of the shell, when the filter unit is closed. This locking ring is part of the locking mechanism presently to be described.

The locking mechanism, according to Figures 2 to 8, comprises a locking ring 20 formed peripherally with crenelations presenting radial outward projections 21 in alternation with recesses 21a. This locking ring 21 surrounds the rim portion of the filter head (see Figures 5 and 6) and is turnably seated thereon as on a peripheral shoulder 22 defined by a transverse annular face 23 and a cylindrical face 24 about which the ring is turnable. This shoulder 22 has associated therewith a series of removable retainer blocks 25 so that the locking ring is rotatably confined between the retainer blocks and the transverse annular face 23. The retaining blocks 25 are secured to the rim portion 18 as by screw bolts 25a.

The entrance portion 19 of the shell is formed with crenelations complementary to those of the locking ring 20, thereby providing radial inward projections 26 in alternation with recesses 27. The locking ring 20 is turnably positionable upon the filter head to have the outward radial projections 21 thereof in registry with the recesses 27 on the shell, and to have the inward radial projections 26 of the shell in registry with the recesses 21a of the rim portion of the filter head. With the locking ring 20 thus positioned, the projections 21 thereof will pass through the recesses 27 while the projections 26 of the shell will pass through the recesses 21, as the shell closes upon the filter head.

The closing movement of the shell completed relative to the filter head, the locking ring 20 is then rotatable again to have its outward projections 21 lodge behind the inward projections 26 of the shell, thereby establishing a locking relationship between the filter head and the shell.

There will now be described the hydraulic power mechanism (see Figures 3, 7, and 8) for applying rotational movement to the locking ring 20 for the purpose of locking or unlocking the filter head relative to the shell. In Figure 3, this mechanism is shown to comprise a pair of hydraulic power cylinder units $H_1$ and $H_2$ disposed laterally at diametrically opposed locations upon the filter head.

These power cylinder units $H_1$ and $H_2$ are symmetrically arranged with respect to each other although acting in the same sense of torque application. These two power units are hydraulically interbalanced for the purpose of imparting to the locking ring 20 a true or balanced actuating torque. The power unit $H_1$ comprises a hydraulic cylinder 28 and a piston rod 29 pointing downwardly and having with the locking ring a pivotal connection 30 by way of a mounting bracket 31 fastened upon the locking ring in a manner more clearly shown in Figures 7 and 8. The cylinder 28 in turn has a pivotal connection 32 by way of a bracket 33 adjustably mounted upon the filter head in a manner more clearly shown in Figure 7. Similarly, the opposite hydraulic power unit $H_2$ comprises an hydraulic cylinder 34 and a piston rod 35.

The piston rod 35 has a pivotal connection 36 with a bracket 37 fastened to the locking ring 20, whereas the cylinder 34 has a pivotal connection 38 with the bracket 39 which in turn is adjustably mounted upon the rim portion of the filter head. It will be noted that the points of pivotal attachment 30 and 36 of the respective piston rods 29 and 35 are located upon a common centerline D of the locking ring or the filter head, so that with the power units $H_1$ and $H_2$ controlled to operate in unison, a substantially true or balanced operating torque is applicable to the locking ring 20.

Referring to Figures 4, 5, and 6, with the filter unit closed, the rim portion 18 of the filter head lodges within the widened entrance portion 19 of the shell, with tolerance or clearance C being indicated between these parts. This clearance or looseness between the filtered head and the shell allows the locking ring 20 to be moved rotationally without encountering undue prohibitive friction so long as the interior of the shell is not subjected to internal pressure when the filter unit is in operation. Sealing means must be provided for closing the internal peripheral line of juncture J, thus to prevent leakage of pressure fluid from the shell under the filter operating conditions.

As shown in Figures 5 and 6 such sealing means comprises a sealing ring 37 fitted into an annular groove 38 provided in the rim portion 18 of the filter head and facing towards the entrance portion of the shell. This groove is substantially square in cross-section and is defined by the bottom $40^a$, the inner cylindrical wall $40^b$, and the outer cylindrical wall $40^c$. The sealing ring 37 comprises a base portion 39 generally shaped for fitting into the groove 38. From the base portion 39 extends a primary or main annular lip 40 presenting an outer conical face $F_1$ adapted to engage upon an inner conical face $F_2$ provided internally upon the entrance portion of the shell. The inner conical face $F_2$ is made as of shallower conicity than that of the outer conical face $F_1$ of the lip, thus causing the lip 40 to be deflected inwardly when the shell closes upon the filter head, thus to insure sealing engagement of the two conical faces $F_1$ and $F_2$ upon each other even while closing the juncture line J which marks the closure of the rim portion 18 of the filter head upon the entrance portion 19 of the shell. The sealing ring 37 has a secondary or auxiliary lip 41 due to the annular gauge $G_2$ formed in the sealing strip. This lip 41 is opposite to the main sealing lip 40 and, when subjected to the filtration operating pressure, will sealingly engage upon the inner cylindrical wall of the receiving groove 38.

In the example shown of the profile of the sealing ring, the outline of the base portion 39 as seated in the groove comprises an outer side $a$; a bottom $b$ defined by an outer flat portion $b_1$, an inner flat portion $b_2$, and an intermediate concave arcuate portion $b_3$; as well as an inner side $c$. The main lip 40 of the profile is defined by an outer annular recess or gauge $G_1$; the outer conical face $F_1$; an inner conical face $F_3$ constituting with the outer conical face $F_1$ an angle of about 45°; and the continuing face $F_4$ constituting with the face $F_3$ an angle of about 120° and merging with the inner annular gauge $G_2$, the face $F_4$ being substanttially parallel to the outer side $a$ of the base portion or else has a small outward inclination as shown. The inner auxilary lip 41 is defined by the gauge $G_2$ and by an inner conical face $F_5$ constituting with the gauge an angle of about 120°.

Referring to the example in Figures 4 and 5, there is shown a differential in conicity as between the conical faces $F_1$ and $F_2$ of about 10°, so that with the filter unit closed (see Figure 6) and lip 40 deflected or biased inwardly by the conical face $F_2$, the face $F_4$ will now have assumed a slightly inward convergence or conicity from the slight outward natural or unbiased conicity or divergence shown in the Figure 5 condition of the sealing ring.

It will be understood that the operation of the hydraulic cylinder units $H_1$ and $H_2$ is governed by limits of the operating stroke in such a manner that the locking ring 20 is rotated through an operating arc corresponding to the locking and unlocking position of the ring.

Yet, it will also be understod that the locking ring 20 can be hand-operated without the use of the hydraulic cylinder units, as is indicated by the provision in Figure 3 of a pair of U-shaped handles or extensions $E_1$ and $E_2$ here shown to be fastened to the locking ring 20 along with or in lieu of the cylinder units $H_1$ and $H_2$.

The concavity $b_3$ at the bottom of the sealing ring 37 represents an annular channel A along the bottom $40^b$ of annular groove 38, in which channel air pressure is maintainable for opposing internal pressure acting upon the area of gauge $G_2$, as well for exerting additional sealing pressure to bear upon the interengaging inner and outer conical faces $F_1$ and $F_2$. A pressure air supply connection for the channel A is provided to enter the bottom of the groove 38, but is here not shown.

While this invention is herein embodied in a batch-operated pressure type filter type unit, such embodiment does not exclude other fields of application such as autoclaves, sterilizers, pressure cookers, polymerizers, or any unfired pressure vessel requiring quick accesss to the inside thereof.

I claim:

1. A pressure filter unit comprising a filter head having a peripheral rim portion and provided with filtrate discharge connections as well as with feed pulp supply connection, and a shell having a peripheral entrance portion surrounding said rim portion and removably connected to the filter head and removable therefrom to expose filter elements normally extending from the filter head into the shell and exposable for filter cake discharge by the withdrawal of the shell, with supporting structure for the filter unit providing an horizontal operating track for the movement thereon of the shell towards and away from the filter head; the combination with said closure member of a locking mechanism for securing the shell to the filter head, comprising a locking ring concentrically surrounding the filter head and rotatably secured thereon, said ring being formed with radial outward projections substantially equidistantly spaced with respect to one another to provide recesses therebetween, said entrance portion of the shell being formed with an equal number of complementary radial inward projections similarly spaced apart with respect to one another to provide recesses therebetween, so that with the filter head and the shell moving into closing engagement with each other and with the locking ring positioned to allow the inward and outward projections to pass through each other's interstices and thus pass each other in the direction of movement of the shell, the ring is rotatable to have the projections thereof engage behind respective inward projections of the shell to establish locking relationship, with the addition of sealing means of elastically deformable material effective to sealingly close the peripheral juncture line between the filter head and the shell incident to their closing upon each other, and hydraulically actuating power means mounted unitarily with the filter head for imparting rotational adjustment to the locking ring in the process of locking and unlocking the filter head and the shell relative to each other, comprising a plurality of at least two hydraulic power cylinder units effective directly between a filter head and the locking ring, said cylinder units being substantially equidistantly spaced from one another along the periphery of the filter head, both cylinders being hydraulically interbalanced and operable to apply between them a balanced actuating torque to the locking ring.

2. A pressure vessel comprising a shell formed with an annular entrance portion, a closure member, locking means for securing the shell and the closure member with respect to one another, the combination with said closure comprising a peripheral rim portion secured to said closure member and adapted to form a line of juncture with said entrance portion in vessel-closing relationship therewith, a locking ring concentrically surrounding the rim portion and rotatably retained thereon, said ring being formed with radial outward projections substantially equidistantly spaced with respect to one another along the periphery to provide a sequence of outward projections and recesses in alternation, said entrance portion of the shell being formed with an equal number of radial inward projections similarly spaced with respect to one another to provide a sequence of inward projections and recesses, said ring being rotationally positionable to have its outward projections in registry with the recesses on the shell and the inward projections of the shell in registry with the recesses of the ring, whereby, said outward and said inward projections will pass through each other recesses as the closure member and the shell move into closing engagement relative to each other, said locking ring thereafter being turnable to have the outward projections thereof engage behind respective inward projections of the shell to establish locking relationship, with the addition of sealing means of elastically deformable material disposed coactive with said cover portion and said shell entrance portion to close the line of juncture between the closure member and the shell incident to their being engaged upon each other, and hydraulically actuated power means for imparting rotational adjustment to the locking ring in a manner to effect locking and unlocking of the closure member in relation to the shell, comprising a plurality of at least two hydraulic power cylinder units effective directly between the closure member and the locking ring, said hydraulic cylinder units being substantially equidistantly spaced from one another along the periphery of the closure member, both cylinders being hydraulically interbalanced and operable to expand or contract in unison to apply to the locking ring a net balanced operating torque.

3. A pressure vessel according to claim 2, in which the ring portion of the closure member is formed with a concentric peripheral receiving groove facing the entrance portion of the shell, and the entrance portion of the shell is formed with a peripheral inner conical face opposite to said groove, and in which said deformable sealing means comprise an annular sealing member having an annular base portion substantially filling said groove, and a main annular lip portion extending from said base portion and having an outer conical face steeper than the aforementioned inner conical face, said annular lip being urged into sealing contact with said inner conical face incident to the closing engagement of the shell upon the filter head with said annular lip being deflected inwardly by the shallower conicity of said inner conical face, said base portion being formed with an auxiliary annular lip opposite to the main lip for sealingly engaging upon the surrounding wall of the receiving groove.

4. A pressure vessel according to claim 3 with the addition that the body portion of the annular sealing member constitutes with the bottom of said groove an annular chamber, with a connection for air pressure supply to said annular chamber, the air pressure in said chamber being adapted to exert additional sealing pressure to bear upon the interengaging inner and outer conical faces.

5. A pressure filter having a housing, a filter leaf assembly means and a closure member to form a hermetic seal between said housing and said closure; the combination with said closure of an elongated annular rim means fixed to said closure, said rim having a radially outwardly extending shoulder portion adjacent one end thereof, a crenelated locking ring rotatably mounted on said rim adjacent said shoulder, retainer means, said ring rotatably secured on said rim between said shoulder and said retainer means, an annular groove formed in the other end of said rim adapted to receive an annular sealing ring, said sealing ring having a lip portion defining an outer conical face, an inner conical face within an entrance portion of said housing, said inner conical face being spaced inwardly beyond said crenelated portion of said entrance whereby said inner and outer conical faces are placed in juxtaposition to form a hermetic seal between said housing and said closure under the influence of a pressurized fluid.

References Cited in the file of this patent

UNITED STATES PATENTS

| 1,663,755 | Gammeter | Mar. 27, 1928 |
| 1,768,167 | Sweetland | June 24, 1930 |
| 2,102,962 | Ludington | Dec. 21, 1937 |
| 2,157,983 | Glougie | May 9, 1939 |
| 2,166,999 | Needham | July 25, 1939 |
| 2,330,220 | Kemper | Sept. 28, 1943 |
| 2,685,189 | Watson | Aug. 3, 1954 |
| 2,696,916 | Peterson | Dec. 14, 1954 |

OTHER REFERENCES

"Chemical Engineering," vol. 62, No. 6, June 1955 pp. 210, 211.